(No Model.)

J. M. SCOTT.
TRACE CARRIER.

No. 304,240. Patented Aug. 26, 1884.

Witnesses.
Louis F. Gardner
A. S. Pattison

Inventor.
J. M. Scott,
per
F. A. Lehmann, atty.

United States Patent Office.

JOHN MATHEW SCOTT, OF LOUISVILLE, KENTUCKY.

TRACE-CARRIER.

SPECIFICATION forming part of Letters Patent No. 304,240, dated August 26, 1884.

Application filed May 27, 1884. (No model.)

*To all whom it may concern:*

Be it known that I, JOHN MATHEW SCOTT, of Louisville, in the county of Jefferson and State of Kentucky, have invented certain new and useful Improvements in Trace-Carriers; and I do declare the following to be a full, clear, and exact description of the invention, such as will enable others skilled in the art to which it pertains to make and use it, reference being had to the accompanying drawings, which form part of this specification.

My invention relates to an improvement in trace-carriers; and it consists in a trace-carrier which is formed of two separate and distinct pieces, one of which is fastened to the band and is provided with points or projections upon its inner side, while the other part moves freely back and forth and is provided with openings to receive the points or projections, and has a hook formed on its lower edge upon which the trace is made to catch, all of which will be more fully described hereinafter.

The object of my invention is to form a trace-carrier in two parts, one of which is stationary on the band, while the other part moves freely back and forth upon the doubled band, and which, when the band is straightened out, at once slides back into position against the stationary part, for the purpose of closing the hook.

Figure 1:
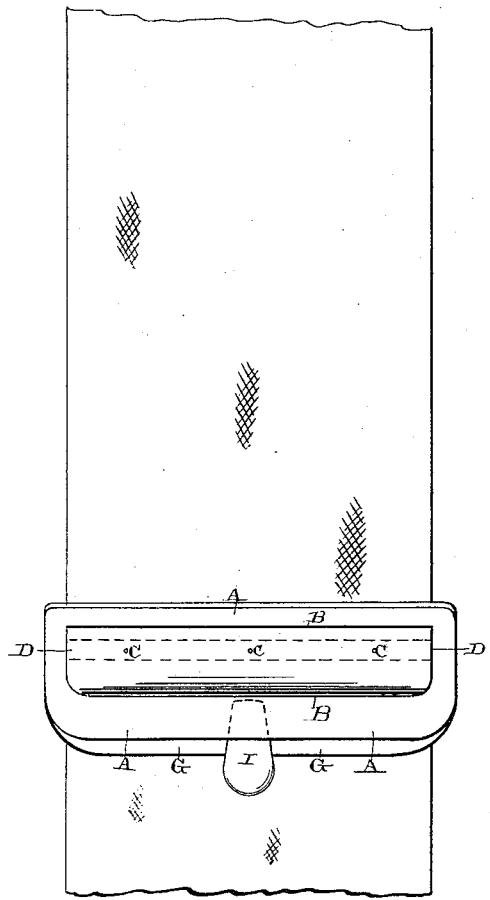
Figure 2:
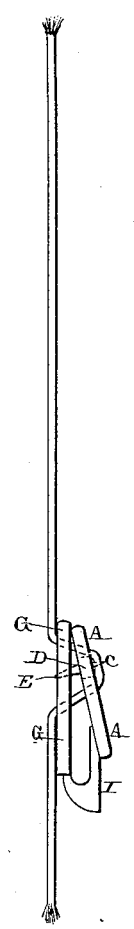
Figure 3:
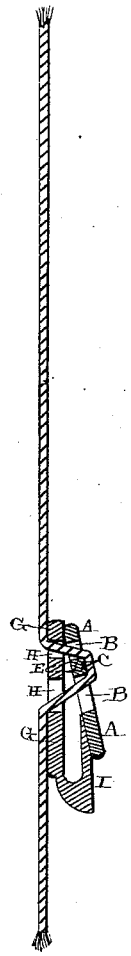

Figure 1 is a side elevation of a trace-carrier embodying my invention. Fig. 2 is an end view of the same. Fig. 3 is a vertical cross-section taken through the center of the hook.

A represents the stationary part of the carrier, which has two slots, B, made through it for the passage of the back-band, and which is provided with the sharp points or projections C upon the cross-bar D, between the two slots, for the purpose of fastening the part A to the back-band in any desired position. Projecting from the inner side of this part A are the two pins or projections E, which are intended to pass through the openings made in the ends of the sliding part G of the carrier, for the purpose of locking the two parts together. The sliding part G of the carrier also has two slots, H, made through it, and has formed upon its lower portion a hook or catch, I, for the trace to catch in or upon. This part G, being loosely placed upon the back-band, can slide back and forth thereon; but when the band is pulled or tightened this part G at once slides upon the band, so as to be brought in contact with the part A. The band acts as a guide to the part G, and as soon as the band is tightened forces this part G against the inner side of the part A. When the two parts come in contact, the pins or projections on the inner side of the part A pass through the openings in the part G, and the lower portion of the part A catches on the outer side of the hook, so as to close it and prevent the trace from becoming detached. When the lower portion of the part A is turned upward, the band is pulled through the part G, so as to allow the two parts to move apart; but when the band is again tightened the two parts instantly force together, as shown. The pins or projections on the part A serve to act as supports for the part G, and prevent any unnecessary strain being brought by the part G upon the back-band.

Having thus described my invention, I claim—

1. In a trace-carrier, the combination of the slotted part A, which is provided with teeth for attaching it to the back-band, with the movable slotted portion G, having a hook formed upon its lower edge, substantially as described.

2. A trace-carrier composed of two separate and distinct parts, one of which is provided with pins or projections on its outer side for fastening it to the band, and with the pins or projections upon its inner side, in combination with the movable part G, having recesses to receive the pins or projections upon the inner side of the part A, and provided with a hook upon its lower edge, which hook is closed by means of the part A, substantially as specified.

In testimony whereof I affix my signature in presence of two witnesses.

JOHN MATHEW SCOTT.

Witnesses:
GEORGE PHILLIP RESCH, Jr.,
LORENZO BEELER.